Sept. 1, 1931.  W. J. COULTAS  1,821,543
CLUTCH MECHANISM
Filed Oct. 7, 1926  2 Sheets-Sheet 1
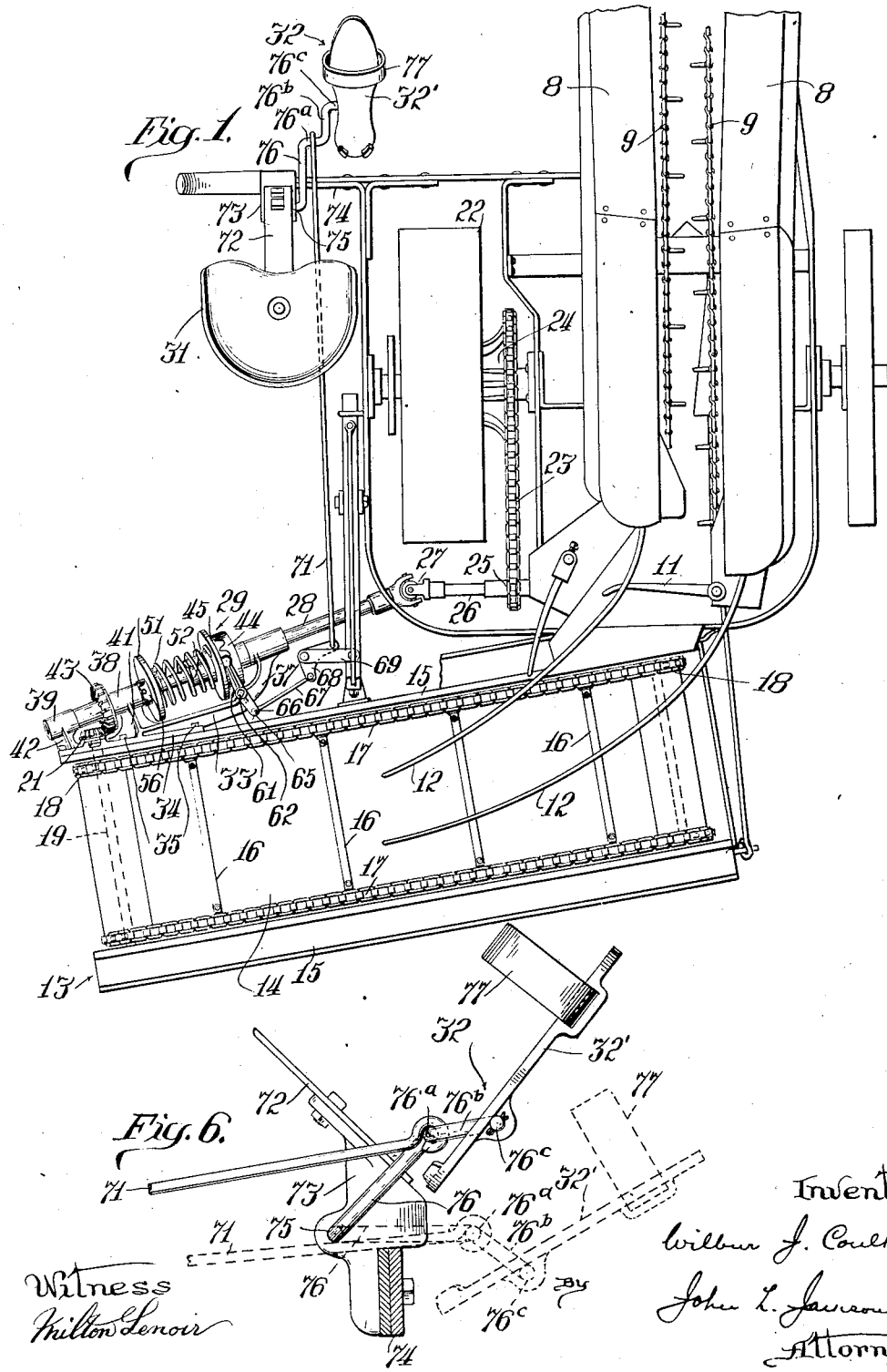

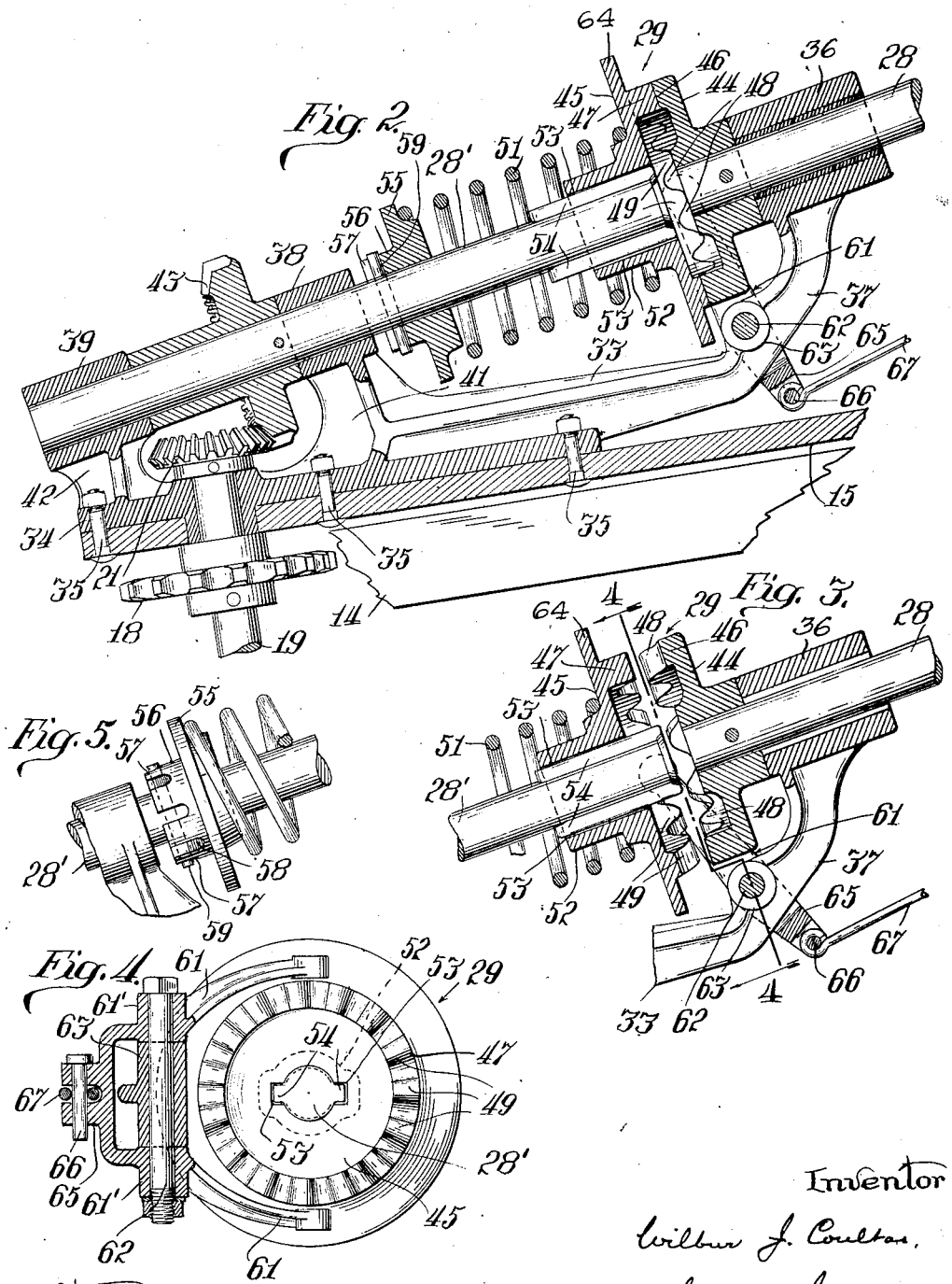

Patented Sept. 1, 1931

1,821,543

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

CLUTCH MECHANISM

Application filed October 7, 1926. Serial No. 139,986.

My invention pertains generally to improvements in clutch mechanism especially adapted for use with corn harvesters for controlling the operation of the bundle carrier with which these harvesters are frequently provided.

For the purpose of illustrating my improved clutch mechanism I have shown the same as embodied in a corn harvester of a type which is in wide use today and wherein the corn stalks, after being cut and bound together, are delivered in bundle form to a carrier disposed at the rear of the machine. This carrier conveys the bundles to the stubbleward side of the harvester and dumps them where they will be clear of the team and harvester on the next round. In most instances this bundle carrier is power operated, generally through a driving train leading from the bull wheel of the harvester, and in order that the operation of the carrier may be stopped and started as desired it is desirable to interpose a clutch in this driving train. This enables the operator to allow several bundles to accumulate on the carrier before it is set into motion, whereby the bundles may be dumped in groups or piles in the field.

In the operation of the machine, it frequently happens that the carrier becomes jammed through lodging of the corn stalks or some foreign matter in the slats, chains, and like parts making up the carrier, and at such times it is imperative that the carrier be stopped instantly, or that some immediate relief be provided, to avoid breakage of the carrier or of the operating parts in the driving train.

It is the fundamental object of the present invention to provide improved clutch mechanism for interposition in this driving train which will serve the dual purpose of a disconnecting element for starting and stopping the carrier, and of an overload relief element for preventing injury to any of the parts in the event of jamming of the carrier. It is a further object of the invention to provide clutch mechanism having this dual function which will be capable of transmitting relatively heavy torques before overload slippage occurs, but which will, nevertheless, be of simple, compact construction. To the end of embodying these characteristics in a simple and inexpensive design, the clutch consists solely of two clutch elements, the contacting faces of which have gradually sloped serrations or teeth therein, which are capable of transmitting a relatively heavy torque, but which, upon slippage, can move over each other without destructive wear. These clutch faces are also capable of rotation in either direction with the same slippage characteristic prevailing for either direction of rotation. A further object, incidental to the above, is to provide improved means for quickly and easily adjusting the pressure of the spring which serves to hold these two clutch faces together.

Still another object of the invention, in connection with my improved clutch mechanism, is to provide improved control means for actuating the clutch when it is desired to start or stop the carrier, which control means will be held automatically in either its clutch engaging or clutch releasing positions, so that no effort is required on the part of the operator to retain the control member in either selected position. Preferably, this control member is embodied in the form of a foot pedal, and this pedal is so arranged and constructed that it can be pulled as well as pushed for movement into its two control positions, in which positions it is yieldably held by spring means so that the operator is relieved of the effort of holding the clutch in either its engaged or released position.

Other objects and advantages of my invention will be apparent from the following description of a preferred embodiment thereof.

In the drawings accompanying this description:

Fig. 1 is a fragmentary plan view of a typical corn harvester embodying my invention;

Fig. 2 is a longitudinal sectional view on a horizontal plane through the clutch mechanism;

Fig. 3 is a similar fragmentary view showing the clutch elements separated;

Fig. 4 is a transverse sectional view taken approximately on the plane of the line 4—4 of Fig. 3;

Fig. 5 is a fragmentary elevational view of the adjustable thrust collar for the clutch spring; and Fig. 6 is a side elevational view of the control pedal and the adjacent linkage connections, through which the clutch is operated.

In the conventional type of corn harvester, fragmentarily illustrated in Fig. 1 to show the relation of the parts of the present invention, the corn stalks enter the harvester in the forward movement of the latter, between two spaced gatherer arms 8, 8 extending from the front part of the machine. The stalks are conveyed and held upright between these gatherer arms by traveling chains 9, 9 moving along the inner sides of the arms this all being in accordance with standard practice. After the stalks are cut at the throat between the gatherer arms they are conveyed by the chains to binding mechanism fragmentarily illustrated at 11. From here the bound bundles are projected laterally and rearwardly between guide arms 12 on to a bundle carrier, generally indicated at 13, and extending laterally and rearwardly from the machine. In the usual construction, this bundle carrier is in the form of an approximately horizontal trough or chute having a bottom wall 14 and side walls 15. Traveling lengthwise of the trough over this bottom wall is a series of spaced slats 16 having their ends connected to endless chains 17 which pass over sprocket wheels 18 at the ends of the trough. The sprocket wheels at the stubbleward end of the carrier are mounted on a shaft 19 suitably journaled in the side walls of the carrier trough and having a bevel gear 21 secured to its front end.

Driving rotation is transmitted to this bevel gear 21 from the large bull wheel 22 of the harvester through any suitable driving train, usually comprising a chain 23 trained over a sprocket wheel 24 connected to the bull wheel, and over a sprocket wheel 25 mounted on a countershaft 26. The end of this countershaft is usually connected through a universal joint 27 to shafting 28 extending diagonally rearwardly toward the bevel gear 21. It is in this shafting 28 that the present clutch mechanism 29 is interposed. This clutch mechanism is operated from the driver's position, represented by the driver's seat 31 located adjacent the front end of the machine. The control of the clutch is preferably exercised through a foot pedal 32 pivotally supported on the frame of the machine adjacent the seat 31.

Referring now to the particular construction of the clutch mechanism, as best shown in Fig. 2, the clutch parts are mounted on the shaft 28 and on a short secondary shaft 28' co-axial therewith, these shafts corresponding respectively to the driving and driven shafts of the clutch. Both shafts are supported in a bearing bracket 33 comprising a mounting plate 34 which is secured by bolts 35 to the side wall 15 of the carrier trough. The driving shaft 28 is journaled in a bearing boss 36 formed on the outer end of an inclined supporting arm 37 extending from the base plate 34. The driven shaft 28' is journaled in two spaced bearing bosses 38 and 39 formed on the outer ends of arms 41 and 42 also extending from the base plate 34. The drive is transmitted from the driven shaft 28' to the bevel gear 21 of the carrier mechanism through a bevel gear 43 which is pinned to the driven shaft between the two bearing bosses 38 and 39.

The driving clutch element 44 is pinned to the end of the shaft 28 directly behind the bearing boss 36, and the driven clutch element 45 is splined to the adjacent end of the shaft 28' for shiftable clutching engagement with the driving element 44. The driving clutch element is formed with a laterally flanged collar 46, and correspondingly, the driven clutch element is formed with a similar laterally flanged collar 47, the flanged portions of these collars extending toward each other, as clearly shown in Figs. 2 and 3. In the opposing faces of these flanged collars are formed matching serrations or teeth 48 and 49. These serrations or teeth are formed as symmetrical projections and indentations having rounded end surfaces and relatively obtuse side surfaces, such side surfaces converging toward the center of each clutch element on radial lines, as shown in Fig. 4. The serrated clutch faces are capable of transmitting a relatively heavy driving torque, but, nevertheless, when overload slippage does occur these surfaces will ride over each other without destructive wear or vibration. It will also be observed that these serrated clutch surfaces are capable of transmitting driving rotation to the carrier in either direction with the same slippage characteristic prevailing, which is of advantage as it enables the harvester to be backed with safety in order to clear the carrier of a jammed condition, as I shall hereinafter describe.

The serrated driving surfaces are normally held in meshed engagement by a compression spring 51 which bears against the back of the driven clutch element 45. The end of this spring is centered on a hub 52 extending from the rear side of the clutch element. Such hub has a pair of diametrically opposite slots or keyways 53 therein which engage over splines or keys 54 projecting from the end of the driven shaft 28', whereby the driven clutch element is free to move longitudinally along the shaft, but compels rotation of the shaft therewith. The opposite end of the spring 51 bears against a thrust collar 55 which is mounted on the shaft 28' adjacent the bearing hub 38, rotating with the shaft 28' so that there is no necessity of an anti-friction bearing for either end of the spring. This thrust collar is capable of assuming different longitudinal positions along the shaft 28' by virtue of the construction best shown in Fig. 5. It will be observed from this figure that the collar has an extending hub 56 having a plurality of pairs of slots 57, 58 of different depths extending inwardly from the end of the hub, the slots of each pair being located at diametrically opposite sides of the hub. These slots engage over a pin 59 extending through the shaft 28' and having its opposite ends projecting from the shaft for engaging in the slots. When the pin is engaging in the relatively shallow slots 57 the thrust collar is held in a forward position for exerting a relatively heavy spring pressure on the clutch. To reduce this spring pressure, it is only necessary to pull the thrust collar forwardly to clear the slots 57 of the pin 59 and to then turn the collar to bring the slots 58 into registry with the pin. This will enable the collar to move further back along the shaft for reducing the spring pressure acting on the clutch. Obviously, any number of pairs of such slots of graduated depths may be provided.

The shifting of the clutch to disengaged position is effected through a forked shifting lever 61 which has its intermediate hub portion 61' pivoted on a bearing bolt 62 extending through a boss 63 formed in the inclined bracket arm 37. As shown in Fig. 4, the rounded ends of the fork arms 61 bear against the flat face of a flange 64 extending radially from the driven clutch element 45. Pivotally connected in the opposite bifurcated end 65 of the shifting lever, on a pin 66, is a link 67 which has pivotal attachment at its opposite end to one arm of a bell-crank lever 68, shown in Fig. 1. This bell-crank lever is pivotally supported on a bracket 69 secured to the frame of the machine. From the other arm of such bell-crank lever a link or rod 71 extends forwardly to the control pedal 32. Referring to Fig. 6, the leaf spring 72 on which the driver's seat is supported, such being a typical form of seat support on these implements, is bolted to the inclined face of a bracket 73 secured to the cross members 74 of the frame. Pivotally supported in this bracket, at a pivot center 75, is a lever 76 constituting the swinging arm portion of the foot pedal 32. This lever 76 preferably consists of a section of round rod bent into the formation best shown in Figs. 1 and 6. This formation comprises a laterally bent portion 76ª, a downwardly inclined portion 76ᵇ, and a second laterally bent portion 76ᶜ. The front end of the actuating link or rod 71, which extends back to the bell-crank lever 68, is pivotally connected to the first laterally bent portion 76ª. The foot plate 32' of the pedal 32 is pivotally supported on the second laterally bent portion 76ᶜ, the latter extending through a pivot boss formed on the under side of the foot plate. This foot plate carries a cross strap 77 for engaging across the top of the operator's foot when placed on this foot plate. Through this strap 77, the foot plate can be pulled upwardly in moving the shiftable clutch element to one of its positions.

It will be observed from Fig. 6, that when the foot plate has been pushed down as far as it will go, as determined by the link 71 striking the top of the frame member 74, this link, or rather its pivotal connection with the foot pedal, will have passed below the pivotal center 75 of the pedal, such lower position being indicated in dotted lines in this figure. The downward movement of the foot pedal into this lower position has pulled the link 71 forwardly, resulting in the rearward shifting of the driven clutch element to its disengaged position, and therefore at this time the pressure of the spring 51 is effective on the link 71 tending to draw the same backwardly. Hence, this spring tension in acting along a line below the pivotal center 75, will tend to hold the foot pedal in its depressed position until it is actually pulled upwardly through the strap 77. Such upward movement of the foot pedal allows the link 71 to move backwardly, and through the other control linkage, allows the driven clutch element 45 to move forwardly into clutching engagement with the driving clutch element under the pressure of the spring 51. With the clutch in this driving position, the foot pedal will be retained in the raised position indicated in full lines through the action of the spring forcing the clutch elements together.

Thus in neither position of the clutch pedal is there any effort required on the part of the operator to hold the pedal in such position. It will be observed that although the foot pedal can be pulled upwardly into its clutch engaging position with a positive pull, under no circumstances can this characteristic of the pedal be utilized to hold the clutch in positive driving engagement against an overload torque inasmuch as the shifting fork 61 has only a one-way engagement with the shiftable clutch member 45 and cannot function to hold the two clutch members in positive driving engagement.

In the operation of the machine, several bound bundles will be permitted to accumulate on the carrier with the latter inert, the control pedal 32 being depressed at this time, corresponding to a disengaged position of the clutch 29. When it is desired to dump the accumulation of bundles, the pedal is pulled upwardly, thereby engaging the clutch and operating the carrier until the accumulation of bundles has been dumped from the end thereof.

In the event of a jam in the carrier, which results in the immediate creation of an overload torque, the driven clutch element 45 will cam itself backwardly through the cam-shaped driving surfaces 48 and 49, whereupon the two clutch elements will merely slip over each other until the jammed condition is relieved. The noise of these two clutch surfaces slipping over each other will immediately apprise the operator of this jammed condition so that the condition that has caused the jamming can be corrected. It should be noted that by constructing the two clutch elements with the sloping projections and indentations a comparatively high torque can be transmitted through a clutch of very compact dimensions.

What I claim as my invention and desire to secure by Letters Patent, is—

1. In clutch mechanism adapted to control the operation of the bundle carrier of a corn harvester, the combination of axially alined driving and driven shafts, cooperating clutch elements non-rotatably mounted on said shafts, spring means normally tending to shift one of said clutch elements into driving engagement with the other clutch element, said clutch elements each comprising cooperating, sloping surfaces adapted to prevent the transmission of overload torque by camming the spring-pressed clutch element backwardly for relative slippage movement between such clutch elements, a clutch release lever having a one-way motion transmitting relation to said shiftable clutch element, whereby said lever is operable to disengage the clutch but is incapable of holding the clutch engaged in opposition to an overload torque, a pivoted foot pedal comprising means enabling the operator to push or pull said pedal, and operating linkage connecting said foot pedal to said clutch release lever, and swinging to both sides of the pivot of said foot pedal, the spring means which engages said clutch elements transmitting pressure through said linkage for resiliently holding said pedal in either its pushed or pulled position.

2. In clutch mechanism adapted to control the operation of the bundle carrier of a corn harvester, the combination of a mounting bracket comprising two spaced bearing bosses, axially alined driving and driven shafts journaled in said bosses, a driving clutch element secured to said driving shaft, a driven clutch element shiftably and non-rotatably mounted on said driven shaft, said clutch elements being disposed between said bearing bosses, spring means surrounding said driven shaft and normally tending to shift said driven clutch element into engagement with said driving clutch element, said clutch elements each comprising cooperating sloping surfaces adapted to prevent the transmission of overload torque by camming said driven clutch element backwardly for relative slippage movement between said clutch elements, a clutch releasing lever operable to shift said driven clutch element to an inoperative position, a foot pedal comprising means enabling the operator to push and pull said pedal, and an operating link connecting said foot pedal with said clutch release lever, said link acting along a line shifting to both sides of the pivot of said foot pedal, whereby the pressure of the spring which engages said clutch elements serves resiliently to hold said foot pedal either in its clutch engaging or clutch releasing position.

3. In combination, driving and driven shafts, two cooperating clutch elements capable of relative overload slippage and adapted to control the transmission of power between said shafts, a spring normally tending to hold said clutch elements in operative engagement, a clutch control member adapted to engage and release said clutch elements, and motion transmitting means operatively connecting said control member with said clutch elements, whereby said spring is operative to resiliently hold said control member either in its clutch engaging or clutch releasing position, and whereby said control member is incapable of holding said clutch elements in positive driving engagement against overload torque.

4. In combination, driving and driven shafts, an overload slippage clutch capable of relative overload slippage and adapted to control the transmission of power between said shafts, a spring normally tending to hold said clutch in driving engagement, a clutch control member, and motion transmitting mechanism connecting said clutch with said control member and having an over-center operating relation whereby the pressure of said spring is operative to resiliently hold said control member either in its clutch engaging or clutch releasing position, said motion transmitting mechanism having a one-way operating relation whereby said control member is incapable of holding said clutch in positive driving engagement against overload torque.

5. In a clutch of the class described, the combination of driving and driven shafts, a driving clutch element fixedly secured to said driving shaft, a driven clutch element shiftably and non-rotatably mounted on said driven shaft, a thrust collar on said driven shaft, a compression spring confined between the thrust collar and said driven clutch element, said clutch elements each comprising cooperating sloping surfaces adapted to prevent the transmission of overload torque in either direction of rotation by camming the spring pressed clutch element backwardly for relative slippage movement between said clutch elements, a thrusting flange on said driven clutch element, a pivoted clutch releasing yoke adapted to transmit movement to said flange only in a direction to separate said clutch elements, a clutch control member comprising a section of rod having laterally bent offset portions adjacent its opposite ends, one of said offset portions serving as a pivot for such control member, a motion transmitting link having pivotal connection with said control member intermediate said offset portions, said latter pivotal connection moving to opposite sides of the pivot of said control member in the movement of the latter, means operatively connecting said motion transmitting link with said clutch releasing yoke, the compression spring which normally holds said clutch elements in engagement transmitting reaction pressure through said yoke and said motion transmitting link resiliently to hold said control member in over-center relation in either its clutch engaging or clutch releasing position, and an actuating member mounted on the other offset portion of said clutch control member.

6. In a clutch of the class described, the combination of driving and driven shafts, a driving clutch element fixedly secured to said driving shaft, a driven clutch element shiftably and non-rotatably mounted on said driven shaft, a thrust collar on said driven shaft, a compression spring confined between the thrust collar and said driven clutch element, said clutch elements each comprising cooperating sloping surfaces adapted to prevent the transmission of overload torque in either direction of rotation by camming the spring pressed clutch element backwardly for relative slippage movement between said clutch elements, a thrusting flange on said driven clutch element, a pivoted clutch releasing yoke adapted to transmit movement to said flange only in a direction to separate said clutch elements, a clutch control member comprising a section of rod having laterally bent offset portions adjacent its opposite ends, one of said offset portions serving as a pivot for such control member, a motion transmitting link having pivotal connection with said control member intermediate said offset portions, said latter pivotal connection moving to opposite sides of the pivot of said control member in the movement of the latter, means operatively connecting said motion transmitting link with said clutch releasing yoke, the compression spring which normally holds said clutch elements in engagement transmitting reaction pressure through said yoke and said motion transmitting link resiliently to hold said control member in over-center relation in either its clutch engaging or clutch releasing position, and a foot plate pivoted on the other offset portion of said clutch control member.

WILBUR J. COULTAS.